June 20, 1967 N. D. BOYER ETAL 3,327,031
PROCESS FOR THE EXTRUSION OF IMPROVED CLOSED-CELL FOAMS
Filed Jan. 22, 1964
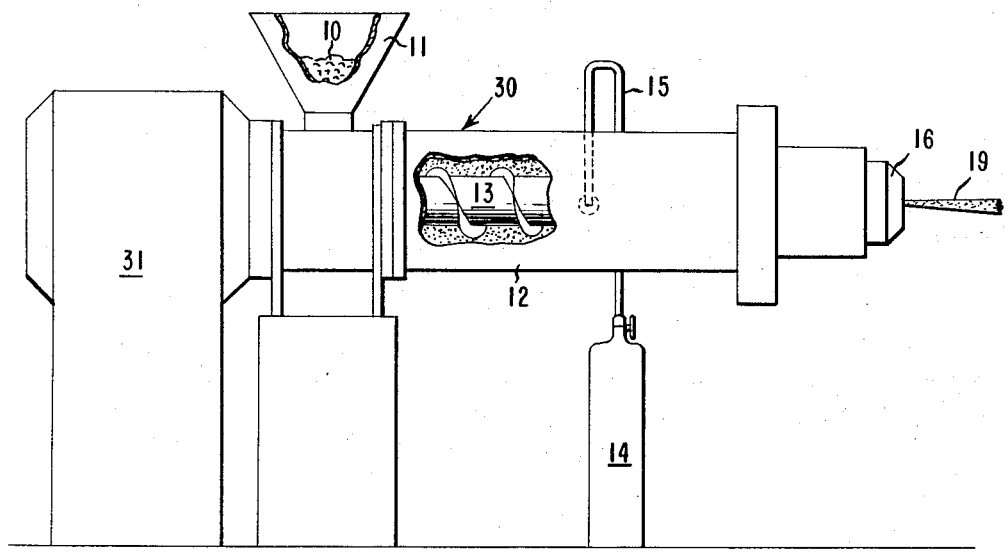
INVENTORS
NOLAN DAVIDSON BOYER
KENNETH WAYNE OTTO
YVES MICHEL TREHU
BY Frank C. Hilberg Jr.
ATTORNEY 3,327,031
PROCESS FOR THE EXTRUSION OF IMPROVED
CLOSED-CELL FOAMS
Nolan Davidson Boyer, North Hills, Del., Kenneth Wayne Otto, Victoria, Tex., and Yves Michel Trehu, Green Acres, Wilmington, Del., assignors to E. I. du Pont de Nemours and Company, Wilmington, Del., a corporation of Delaware
Filed Jan. 22, 1964, Ser. No. 339,458
18 Claims. (Cl. 264—53)

This invention relates to novel methods for the preparation of foams from thermoplastic resin, and, more particularly, to the preparation of improved closed-cell foams. This application is a continuation-in-part of our copending application, Ser. No. 87,418, filed Feb. 6, 1961, for "Polyolefin Foams" and now abandoned.

Many processes are currently known which result in the formation of closed-cell, foamed structures from thermoplastic resins, all of which are based on the use of a blowing agent. In one process, the thermoplastic resin is mixed with a solid blowing agent. The compounded resin is heated to above its melting point to a temperature sufficiently high enough to cause the rapid decomposition of the blowing agent into gaseous products which cause the resin to expand into a foamed structure. While the gas is expanding the resin is cooled to below its melting point which causes the foamed structure to become rigid and retain its shape. In another process, the thermoplastic resin is contacted with a volatile solvent capable of dissolving in the resin. The resin with the dissolved solvent is heated, under pressures sufficient to keep the solvent dissolved in the resin, to a temperature above the melting point of the compounded resin and the atmospheric boiling point of the solvent. The pressure is then released; this causes the solvent to vaporize, and again the thermoplastic resin is expanded into a foamed structure. The preferred process, and one which is best suited for the continuous production of foamed structures comprises the injection of a gaseous blowing agent, such as carbon dioxide or nitrogen, into a thermoplastic polymer melt as it is moved through an extruder. Sufficient pressure is applied to both the blowing agent and the polymer to cause a desired quantity of the gas to dissolve in the polymer melt. As the thermoplastic resin leaves the extrusion die the pressure differential causes a decrease in the solubility of the gas. The released gas expands the cooling, extruded thermoplastic resin into a foamed structure.

While these processes are employed in the preparation of closed-cell thermoplastic resin foams, these methods are generally deficient in one or more important respects. Thus, these processes are not suitable for the preparation of thermoplastic resin foams which combine a low density with a small cell size. When it is attempted to make low density foams with these techniques, invariably a low density foam with large cells is obtained. Foams with large cells are undesirable since they rupture at considerably lower degrees of compressive deformation and do not give rise to a homogeneous product. It will also be apparent that large cell sizes are unsuitable for the preparation of foams in thin sections. Decreasing the concentration of the blowing agent does not materially decrease the cell size of the foam, it may even cause an increase in the cell size, but, principally, causes the number of cells to decrease, resulting in an extrudate which is not homogeneously foamed, but contains major, randomly distributed solid sections.

Recently, it was discovered that by the addition of a finely divided, inert solid to the polymer melt a substantial increase in the number of cells could be obtained for a given concentration of blowing agent, and, consequently a smaller cell size for any given density of the foam. It has been postulated that this solid acts as a nucleating agent in the formation of the foam cells. In order to achieve the best possible result with the nucleating agent, it is necessary to have a homogeneous distribution of such finely divided, inert solid through the polymer. Although this discovery greatly improved the uniformity and appearance of the foam and resulted in an improvement of the compressive properties in the foam, it still limited the production of foams with respect to density and cell size. For instance, in the case of branched polyethylene, small cell sizes, in the range of 5 to 20 mils, at low density could not be achieved through this improvement.

It is an object of the present invention to provide a novel process for the preparation of closed-cell foams from thermoplastic resins. It is another object of the present invention to provide a process for the preparation of closed-cell foams from thermoplastic resins which permits wider range of cell-size and density combinations. A further object of the present invention is to provide a process which permits the formation of uniform closed-cell foams from thermoplastic resins which have a small cell size. Still another object of the present invention is to provide a process which permits the foaming of thermoplastic resins in thin sections. Other objects will become apparent hereinafter.

In accordance with the present invention it was discovered that greatly improved closed-cell foams can be obtained from thermoplastic resins by a process which comprises preparing a solution of an inert gaseous foaming agent in a thermoplastic resin, extruding the mixture at a temperature above the melting point of the mixture through an orifice into a medium maintained at substantially atmospheric pressure, applying to the extrudate at the orifice, pulsating mechanical energy and recovering a foam having a homogeneous superfine cell structure.

Specifically, the process of the present invention may be carried out by the continuous extrusion of the thermoplastic resin wherein a thermoplastic resin is fed into an extruder, heated to above its melting point, until a uniform melt is obtained into which the foaming agent, an inert compound gaseous at the extrusion temperature, is then injected. It is however, also feasible to admix the polymer prior to extrusion with a solid foaming agent, i.e., a compound which decomposes at the extrusion temperatures into gaseous components. The pressure exerted on the melt by the extruder screw is maintained such as to cause the solution of the foaming agent in the polymer. To assure a homogeneous mixture, the polymer melt containing the blowing agent is then passed through a mixing section in the extruder. The melt, maintained under sufficient pressure to keep the foaming agent in solution and at a temperature above the melting point of polymer foaming agent blend, is then extruded through an orifice into a medium substantially maintained at atmospheric pressure. The temperature of the blended polymer melt is generally reduced from the temperature of the unmodified polymer melt, since the addition of the foaming agent usually causes a decrease in the melting point of the polymer and since it is in general desired to extrude the foam at a temperature as close as possible to the melting point to permit solidification of the extrudate as soon as possible. The medium into which the melt is extruded is generally air, but may be a liquid cooling medium such as water. The pulsating mechanical energy is applied at the orifice before any substantial cooling or foaming of the extrudate has occurred. After the application of the mechanical energy, the foam is permitted to cool to room temperature. Cooling may be gradual or the foamed extrudate can be quenched. As indicated above, the addition of a finely divided solid to the polymer before extrusion will aid in the uniformity of the cell sizes. In a preferred embodiment of the present invention, this feature is, therefore, included in the above-described process.

The critical feature of the foam extrusion process of the present invention comprises the application of pulsating mechanical energy to the extrudate at the orifice before solidification of the extrudate has occurred. The result of mechanical energy distributed in the form of shock waves through the extrudate is the formation of a superfine cell structure. As indicated above, the formation of a uniform superfine cell structure is aided by the addition of a finely divided, inert solid which acts as a nucleating agent for the foam. In the present invention the pulsating energy is applied in the form of shear at the die orifice. The flow behavior of polymer melts through orifices has been extensively studied and is generally known as polymer rheology. It has been established that as the rate of extrusion of a thermoplastic polymer melt is increased through a given orifice at a given temperature a corresponding increase in shear rate occurs and, similarly, a corresponding increase in shear stress at the orifice can be observed with increasing extrusion rates. The extrusion of smooth extrudates, conforming to the shape of the die orifice at increasing extrusion rates is, however, limited by the phenomenon generally known as melt fracture. Thus, by increasing the extrusion rate while maintaining all other conditions constant a critical shear stress will be reached beyond which the extrudate no longer is smooth and conforms to the shape of the die but is torn, rough and irregular, i.e., the laminar flow of the melt through the orifice is disrupted. It is believed that melt fracture results in a pulsating energy release at the orifice of the die. In accordance with the process of the present invention, it was discovered that the energy transmitted to the extrudate at and above the critical shear stress is sufficient to cause the formation of the fine-celled foams of the present invention. If a thermoplastic resin which is compounded with a gaseous blowing agent is extruded at or above the critical shear stress not only does this result in the formation of the superfine cell foam structure, but the absorption of the energy in the foam formation also restores the laminar flow of the plastic through the orifice so that a smooth extrudate is obtained, the shape of which corresponds to the shape of the orifice. The critical shear stress will vary depending on the thermoplastic polymer extruded, the configuration of the die and the temperature of the extrudate. However, conditions for the extrusion of the foams of the present invention using the pulsating energy occurring at and above the critical shear stress are readily determined by extruding the polymer without the foaming agent under the condition it is desired to extrude the foam, increasing the extrusion rate until melt fracture occurs and then using such or higher shear stresses in the extrusion of the foam. It is, of course, also possible to calculate the critical shear stress of a polymer at a given temperature using measurements made on constant rate rheometers, and then applying the results to the conditions at which it is desired to extrude the foam. Critical shear stresses for polyethylene are in the range of 1 to $3 \times 10^6$ dynes/cm.$^2$ for dies having an approach angle of about 20°. One can generally ascertain when the extrusion rate is sufficient to produce melt shear above the critical shear stress by progressively increasing the extrusion rate until a decrease in cell size in the extruded foam is observed, since the cell size is nearly constant at rates below the critical rate, and generally varies with the extrusion rate above this rate. The critical shear stress can also be determined by employing the conditions under which the foam is to be extruded and determining melt fracture of a sample of the thermoplastic resin having the same melt viscosity in the absence of the inert gaseous compound or blowing agent that the resin being extruded has in the presence of the inert gaseous compound or blowing agent with which it is being extruded. The minimum rate for melt fracture corresponds to the critical shear stress. Generally, the simplest way to determine this rate is to first find the temperature at which the melt viscosity of the resin in the absence of the inert gaseous compound is equal to the melt viscosity at the extrusion temperature of the resin in the presence of the inert gaseous compound, and then extrude the resin at increasing rates in the absence of the inert gaseous compound, at the temperature thus determined until melt fracture occurs. Sometimes, if large quantities of inert gaseous compound or blowing agent are to be used, it is not possible to obtain the same melt viscosity with the same resin by merely increasing the temperature, due to the fact that the melt viscosity of the resin and gaseous compound is so low that degradation of the polymer occurs before the temperature can be raised high enough to reduce melt viscosity of the resin in the absence of the inert gaseous compound, to the melt viscosity of the resin in the presence of the inert gaseous compound. In such case, a sample for use in the extruded to determine the rate which gives rise to melt fracture may be obtained by either using a lower molecular weight sample of the same resin, or by using a solution of the same resin, having the same molecular weight, and a solvent having a boiling point above the extrusion temperature being used, which yields a solution at the extrusion temperature. It is contemplated that whenever possible, the minimum extrusion rate is to be determined by raising the temperature to obtain the same melt viscosity exhibited by the same polymer being extruded with the inert gaseous compound but in the absence of the inert gaseous compound and then extruding at that temperature in the absence of the inert gaseous compound, until melt fracture occurs. If the minimum extrusion cannot be determined by increasing the temperature, it is contemplated that the minimum extrusion rate is to be determined by using a sample of the same resin but which sample is of a lower molecular weight. When using a lower molecular weight sample, the degree of crosslinking, ratio of monomers in the case of copolymers, and all other factors should be kept as close to that of the resin being extruded with the inert gaseous compound. It is also important that the lower molecular weight sample be a structural plastic or film or fiber forming resin. Thus the minimum apparent viscosity should be at least 100 poise. As a third alternative, the minimum extrusion rate is to be determined by adding a solvent to the sample of resin being extruded.

The process of the present invention is applicable to all thermoplastic resins which can be fabricated by melt extrusion. Suitable resins include polyolefin such as polyethylene, polypropylene, polybutene, polystyrene, ethylene copolymers and styrene copolymers, polyamides, such as polyhexamethylene adipamide and polycaprolactam, acrylic resins such as polymethyl methacrylate and methyl methacrylate copolymers, polyethers such as polyoxymethylene, halogenated polymers, such as polyvinyl chloride, polyvinylidene chloride, polychlorotrifluoroethylene, copolymers of tetrafluoroethylene and hexafluoropropylene, polycarbonate resins and cellulose resins. The resins which have shown themselves to be outstanding in the process of the present invention are the polyolefin resins and, particularly, polyethylene and polypropylene.

The foaming agents which are useful in the extrusion of foam are known. Aside from being gaseous at the extrusion conditions, it is necessary that the foaming agent is inert in the sense that it will not react with the polymer under the extrusion conditions. As indicated above, solids which decompose into gaseous products at the extrusion temperatures, as well as volatile liquids, may be employed. Solids which are suitably employed in the process of the present invention include azoisobutyric dinitrile α,α-azobisisobutyronitrile, diazoamino benzene, 1,3-bis(p-xenyl)triazine and similar azo compounds which decompose at temperatures below the extrusion temperature of the foaming composition. Commonly used solid foaming agents producing either nitrogen or carbon dioxide include sodium bicarbonate and oleic acid, ammonium carbonate and mixtures of ammonium carbonate and sodium nitrite. Volatile liquids which are suitable foaming agents include acetone, methyl ethyl ketone, ethyl acetate, methyl chloride, ethyl chloride, chloroform, methylene chloride, methylene bromide and, in general fluorine containing normally liquid volatile hydrocarbons. The preferred foaming agents, however, are the normally gaseous compounds such as nitrogen, carbon dioxide, ammonia, methane, ethane, propane, ethylene, propylene and gaseous halogenated hydrocarbons. A particularly preferred class of foaming agents are fluorinated hydrocarbon compounds having from 1 to 4 carbon atoms which, in addition to hydrogen and fluorine, may also contain chlorine and bromine. Examples of such blowings agents are dichlorodifluoromethane, dichlorofluoromethane, chlorofluoromethane, difluoromethane, chloropentafluoroethane, 1,2 - dichlorotetrafluoroethane, 1,1-dichlorotetrafluoroethane, 1,1,2-trichlorotrifluoroethane, 1,1,1 - trichlorotrifluoroethane, 2-chloro-1,1,1-trifluoroethane, 2-chloro-1,1,1,2 - tetrafluoroethane, 1-chloro-1,1,2,2-tetrafluoroethane 1,2 - dichloro-1,1,2-trifluoroethane, 1-chloro-1,1,2-trifluoroethane, 1-chloro-1,1-difluoroethane, perfluorocyclobutane, perfluoropropane, 1,1,1-trifluoropropane, 1-fluoropropane, 2-fluoropropane, 1,1,1,2,2-pentafluoropropane, 1,1,1,3,3 - pentafluoropropane, 1,1,1,2,3,3 - hexafluoropropane, 1,1,1-trifluoro-3-chloropropane, trifluoromethyl-ethylene, perfluoropropene and perfluorocyclobutene.

The quantity of foaming agent employed will vary with the density of foam desired—a lower density requiring a greater amount of foaming agent—the nature of the thermoplastic resin foamed and the foaming agent employed. In general, the concentration of the foaming agent will be from 0.001–5 lb. moles/100 lbs. of the thermoplastic resin.

In a preferred embodiment of the present invention, the thermoplastic resin is homogeneously admixed with a nucleating agent. The chemical composition of the nucleating agent is of little importance as long as it meets the criterion of inertness towards polymer and blowing agent at the extrusion conditions and the criterion of insolubility in the polymer. Metal oxides, such as silica, titania, alumina, zirconia, barium oxide, magnesium oxide and metal salts, such as sodium chloride, potassium bromide, magnesium phosphate, barium sulfate, aluminum sulfate, boron nitride, etc., are highly suitable. As indicated above, it is essential, however, that the nucleating agent be finely divided and uniformly dispersed throughout the polymer. In general, the particle size of the nucleating agent should be smaller than 1 mil and preferably in the range of 0.001 to 0.5 mil. The concentration necessary to achieve uniform nucleation varies with the degree of dispersion. If the degree of dispersion that can be achieved is high, only a low concentration of the nucleating agent is necessary; if the degree of dispersion is poor, a higher concentration will be required. With known compounding techniques for the distribution of finely divided solids in thermoplastic resins, the concentration of the nucleating agent will, in general, vary from 0.1 to 5% based on the weight of the polyethylene.

The novel features of the process of the present invention are further illustrated in the attached drawing, which illustrates schematically the extrusion of foamed sheeting in accordance with the present invention.

Referring to the drawing, a thermoplastic resin 10 in the form of cubes or powder admixed with a nucleating agent, if desired, is charged through hopper 11 into the heated extruder barrel 12 of the extruder 30 where the polymer is heated, melted and advanced through the extruder barrel by the extruder screw 13 turned by a power source located at 31. At a point in the extruder barrel 12 where the resin 10 is uniformly molten, a normally gaseous blowing agent 14 is injected under pressure by means of a probe into the polymer melt through line 15. As a result of the pressure exerted on the melt, the gaseous blowing agent becomes dissolved in the polymer as it is pushed towards the extrusion die 16. As the polymer melt emerges from the slit die orifice 18, the attendant pressure drop allows the blowing agent 14 to expand, thereby forming a foamed sheet 19.

The density and cell size of the foam produced can be controlled by the amount of mechanical energy employed, the quantity of blowing agent added and the temperature at which the foam is extruded. Thus, the quantity of blowing agent largely determines the density of the foam, while the amount of energy applied and the temperature of the extrudate can be employed to control the cell size. It will be apparent that a larger quantity of blowing agent will result in a lower density foam. A greater amount of mechanical energy will result in a smaller cell size.

The extrusion of thermoplastic resins into foams in accordance with the process of the present invention is within the range of conditions heretofore described for the extrusion of thermoplastic resins into foams. Thus, the barrel temperature of the extruder is preferably maintained at temperatures such that the mixture itself is at its melting point, so as to be viscous and capable of flowing. Since substantial heat is liberated by the working of the polymer as it moves through the extruder it may be even necessary to cool portions of the extruder. For polyethylene, the temperature of the barrel is generally maintained at 90 to 150° C. The extruder screw may have various designs. In general, however, it contains a plastification and densification section in which polymer is molten and subjected to increasing pressure, a section of reduced pressure, which is achieved, for example, by deepening the channel of the extruder screw, in which the blowing agent is injected, and a section of increasing pressure in which the blowing agent becomes dissolved in the resin. Such a screw is, for example, illustrated in U.S. 2,928,130, issued to A. N. Gray on Mar. 15, 1960. Instead of the reducing pressure and increasing pressure sections, it may be preferred to employ an extruder screw containing a mixing section, such as described in U.S. 2,453,088, issued to F. E. Dulmage on Nov. 2, 1948, in which the blowing agent becomes dissolved in the polymer. Another extrusion screw suitable in the process of the present invention is described in U.S. 2,860,377, issued to E. C. Bernhardt et al. on Nov. 18, 1958. The molten polymer containing the dissolved blowing agent is forced into the extrusion die from which it is extruded into the desired shape by the die orifice. The temperature of the die is maintained such that the extruding composition is at a temperature close to its melting point. This is necessary to impart, as much as possible, rigidity and shape retention to the extrudate which, if temperatures substantially above the melting point are employed, would result in a collapsed foam, since the melt does not have sufficeint strength to support the expanded shape. The die should also be so constructed as to prevent foaming of the composition in the die. This can be accomplished by employing, for example, a die with a short land length or by variation of the angle of the approach to the die orifice. It was further discovered that large shapes could be continuously extruded by using multi-orificed dies and allowing the emerging extrudates to weld together as they expand. The use of a single orifice is significantly limited, since as the size of the orifice is increased the flow necessary to create a back pressure sufficient to keep the blowing agent in solution in the polymer melt increases by a third order magnitude. It is also difficult with large orifices to achieve extrusion rates at which the critical shear stress is obtained. Furthermore, a single extrudate as it is increased substantially in one dimension, e.g., such as in the formation of wider foamed sheets, is subject to wrinkling and loss of shape. These problems are substantially avoided by the use of a multi-orifice die.

The present invention is further illustrated by the following examples.

*Examples 1 to 8*

Into a 2″ "Royle" extruder was charged 100 lbs. of polyethylene having a density of 0.914 g./cc. and a melt index of 2.0 g./10 min. The polyethylene had been prior to charging to the extruder, dry tumbled with 1.5 lbs. of finely divided barium sulfate having a particle size of about 0.05 mil. Barrel temperature was adjusted to produce a melt temperature of about 140° C. The melt emerging from this extruder was directly fed to a second 2″ extruder, having a 35″ long barrel. The screw consisted of a section having a deep channel followed by a section in the form of an extruder mixing torpedo. The rear portion of the screw had no flights so that an appropriate packing could be installed to prevent leakage. The barrel of the second extruder was wrapped with cooling coils to facilitate cooling of the polymer mixture to the desired extrusion temperature and the solution of the blowing agent in the polymer. The extruder was adjusted to deliver 20 lb./hr. of polyethylene. Liquid 1,2-dichlorotetrafluoroethylene, a normally gaseous material, was injected into the polymer melt through an injection nozzle in the barrel located in the deep flighted section of the screw. The rotating speeds of the two screws in the two extruders were maintained such that the pressure at the injection point was below 500 p.s.i.g. The liquid 1,2-dichlorotetafluoroethylene was pumped into the polymer melt by means of an adjustable displacement pump at the rate indicated in Table I. The temperature of the cooling water in the barrel was adjusted until the polymer temperature at the die was that indicated in the table. Three different types of dies were employed. Die A was a 0.050″ by 1″ slit with a 0.050 land and an 18° approach; Die C and 0.017″ by 1″ slit, 0.050 land and an 18° approach; Die D an 0.0075″ by 1″ slit, a 0.030 land and an 18° approach. The results obtained in the extrusion of foam at various shear rates resulting from the variation in die design and screw speed are summarized in Table I.

TABLE I

| Example | Rate of Polyethylene Extrusion, lb./hr. | Rate of Addition of Foaming Agent, lb./hr. | Die Design | Shear Rate in sec.$^{-1}$ | Die Temp. in ° C. | Shear Stress in dynes/cm.$^2$ | Density, lb./cu. ft. | Cell "Size" in mils |
|---|---|---|---|---|---|---|---|---|
| 1 | 7.5 |  | A | 150 | 190 | $2.1 \times 10^{+6}$ | No melt fracture of extrudate | |
| 2 | 17.5 |  | A | 350 | 190 | $3.5 \times 10^{+6}$ | Melt fracture of extrudate | |
| 3 | 16.0 | 4.5 | A | 320 | 98 | $1.5 \times 10^{+6}$ | 2.0 | 30 |
| 4 | 21.5 | 4.2 | A | 430 | 104 | $2.2 \times 10^{+6}$ | 3.1 | 60 |
| 5 | 11.0 | 1.6 | A | 220 | 107 | $2.0 \times 10^{+6}$ | 4.2 | 100 |
| 6 | 9.9 | 2.7 | D | 9,000 | 98 | $4.3 \times 10^{+6}$ | 2.1 | 9 |
| 7 | 14.8 | 2.9 | C | 2,500 | 103 | $3.8 \times 10^{+6}$ | 3.0 | 25 |
| 8 | 12.1 | 12.1 | D | 11,000 | 106 | $6.0 \times 10^{+5}$ | 3.9 | 7 |

*Examples 9 to 12*

In Table II, the conditions and results of a number of foam extrusions using various polymer resins and various foaming agents, as well as a number of nucleating agents, are illustrated. A number of extruder set-ups were employed. The standard extruder set-up comprised the combination of two extruders described in Examples 1 to 8. A second extruder set-up comprised a normal 1½″ extruder without any modification. A third extruder set-up comprised a normal 2″ extruder equipped with a mixing head and an injection nozzle.

The table shows that type of polymer extruded into a foam, the rate of extrusion, the foaming agent employed, the ratio of the foaming agent to the polymer, the type of nucleating agent and the quantity thereof when employed. The extrusion conditions are defined by the extruder set-up employed, the temperature to which the polymer was heated before injection of the foaming agent, the temperature to which the resulting mixture was cooled down when it reached the die, the dimensions of the orifice, and the shear rate resulting from these extrusion conditions. The cell size obtained under these conditions is listed as well as the cell size obtained when the shear rate is reduced to below the critical value.

TABLE II

| Example | 9 | 10 | 11 | 12 |
|---|---|---|---|---|
| Polymer | High Density Polyethylene: d=0.95 g./cc.; M.I.=0.6 g./10 mn. | Polypropylene | Copolymer of TFE/HFP | Polyoxymethylene. |
| Extrusion Rate, lb./hr | 9.1 | 7.2 | 3.2 | 19. |
| Foaming Agent | Dichlorotetrafluoroethane | $CFCl_3$ | $CHClF_2$ | $H_2O$. |
| Foaming Agent, lb./lb. of polymer | 0.12 | .15 | Sat. at 7 p.s.i.g | 0.16. |
| Nucleating Agent | $BaSO_4$ | $BaSO_4$ | None | Talc. |
| Wt. percent of Nucleating Agent | 1.5 | 1.5 |  | 2.0. |
| Extruder Set-Up | Std | Std | Normal 1½″ | Normal 2″. |
| Temp. of Melt Before Injection | 175° C | 190° C |  |  |
| Die Temperature | 135° C | 150° C | 277° C | 165° C. |
| Orifice Dimension | 1″ x .010″ | 1″ x .0075″ | 1″ x .010″ | 0.25″ x .010″. |
| Shear Rate, sec.$^{-2}$ | 4,500 | 6,600 | 2,000 | 30,000. |
| Cell Size in mils | 5 | 15 | 10 | 10. |
| Cell Size in mils below critical shear rate | 15 | 60 | 50 | 50. |
| Density of Foam, lb./cu. ft | 4.1 | 2.5 | 55 | 2.3. |

Example 13

Polycaprolactam is extruded under the conditions set forth in Example 12, using water as the gaseous compound, except that 0.05 lb. foaming agent/lb. polycaprolactam is used, and the die measures 0.25" x 0.005", and the extrusion temperature is 225° C. The cell size is smaller under these conditions than is obtained when this composition is extruded below the critical melt shear rate.

The average cell size of the foams produced in the examples was computed by measuring with a microscope the diameter of an inscribed sphere within a selected number of cells chosen at random. It is important in this measurement to illuminate the sample in such a way as to get a three dimensional appearance through the microscope so that the diameter of an inscribed sphere within the cell can be properly estimated. The density of the foam was obtained by a measurement of the volume of the foam through measurement of the geometrical dimensions and measurement of the weight. Weight measurements of the same were made on aged samples so that the blowing agent had diffused out of the cells and had been replaced by air. The melt index of the polymer was determined in accordance with ASTM–D–1238–52T.

Examples 1 to 8 demonstrate the formation of foamed structures by the application of mechanical energy in the form of shear above the point of melt fracture. The shear stress required to obtain melt fracture in the absence of a blowing agent is shown in Examples 1 and 2. Examples 3 to 5 show the formation of foams at shear stresses below the critical shear stress, i.e., at shear stresses at which no melt fracture will occur on ordinary extrusion. Examples 6 to 8 show the formation of foams at shear stresses above the critical shear stress. Shear rates in units of reciprocal seconds were determined by calculation using the equation $$\text{Shear rate} = \frac{6 \times (\text{Volumetric Flow Rate})}{(\text{Die Width})\ (\text{Die Gap})^2}$$

Shear stresses in units of dynes/cm$^2$ were determined by using the equation $$\text{Shear Stress} = \frac{69{,}000\ (\text{Die Pressure Drop})\ (\text{Die Gap})}{2 \times \text{equivalent land length}}$$

where the equivalent land length includes a length to allow for the fraction of the pressure drop occurring upstream from the land, often called the "entrance effect." The foams produced by Examples 6 to 8 show a substantial improvement in the cell size. The results show that in addition to shear stress, the amount of the blowing agent and the temperature of the die affect the structure of the foam.

The foregoing results show two features of the process of the present invention, namely, the ability to foam thin extrudate which heretofore was not feasible and the ability by means of this process, to obtain a substantial reduction in the cell size.

It is to be understood that the foregoing examples are not intended to limit the process of the invention thereto. As will be apparent from the foregoing description and examples, various modifications may be carried out without departing from the scope of the invention. As a general rule, the process of the present invention can be adapted to any known method for the extrusion of thermoplastic resin into a foam and result in a foam having improved mechanical and electrical properties of greater uniformity and better appearance.

We claim:

1. A process for the extrusion of thermoplastic resins into foam which comprises heating a thermoplastic resin to a temperature above the melting point, maintaining the resulting melt under pressure, dissolving therein an inert compound gaseous at the melting point of the mixture, thereafter extruding said composition of polymer melt and dissolved inert gaseous compound at a temperature above the melting point of the mixture through an orifice into a medium maintained at substantially atmospheric pressure, applying to the extrudate at the orifice before substantial foam formation pulsating mechanical energy by maintaining an extrusion rate through said orifice which is at least equal to the rate which gives rise to melt fracture in the extrusion of a sample of the same thermoplastic resin, having the same melt viscosity in the absence of said inert gaseous compound that the resin being extruded has in the presence of said inert gaseous compound with which it is being extruded and recovering a foamed extrudate of superfine cell structure.

2. A process for the extrusion of thermoplastic resins into foam which comprises heating a thermoplastic resin to above its melting point, maintaining the resulting melt under pressure, dissolving therein from 0.001 to 5 lb. moles/100 lbs. of the thermoplastic resin of a normally gaseous inert compound, thereafter extruding said composition of polymer melt and dissolved inert gaseous compound at a temperature above the melting point of the mixture through an orifice into a medium maintained at substantially atmospheric pressure, applying to the extrudate at the orifice before substantial foam formation pulsating mechanical energy by maintaining an extrusion rate through said orifice which is at least equal to the rate which gives rise to melt fracture in the extrusion of a sample of the same thermoplastic resin, having the same melt viscosity in the absence of said inert gaseous compound that the resin being extruded has in the presence of said inert gaseous compound with which it is being extruded and recovering a foamed extrudate of superfine cell structure.

3. A process for the extrusion of thermoplastic resins into closed-cell foam which comprises heating a thermoplastic resin containing from 1 to 5% by weight of the resin of a finely divided inert solid to above its melting point, maintaining the resulting melt under pressure, dissolving therein from 0.001 to 5 lb. moles/100 lbs. of the thermoplastic resin of a normally gaseous inert compound, thereafter extruding said composition of solid, polymer melt and dissolved inert gaseous compound at a temperature above the melting point of said mixture through an orifice into a medium maintained at substantially atmospheric pressure, applying to the extrudate at the orifice before substantial foam formation pulsating mechanical energy by maintaining an extrusion rate through said orifice which is at least equal to the rate which gives rise to melt fracture in the extrusion of a sample of the same thermoplastic resin, having the same melt viscosity in the absence of said inert gaseous compound that the resin being extruded has in the presence of said inert gaseous compound with which it is being extruded and recovering a foamed extrudate of superfine cell structure.

4. The process of claim 2 wherein the thermoplastic resin is a polyolefin.

5. The process of claim 2 wherein the thermoplastic resin is a fluorocarbon resin.

6. The process of claim 2 wherein the thermoplastic resin is a polyoxymethylene.

7. The process of claim 2 wherein the thermoplastic resin is a polyamide.

8. The process of claim 7 wherein the thermoplastic resin is polycaprolactam.

9. The process of claim 2 wherein the foaming agent is a halogenated hydrocarbon containing from 1 to 4 carbon atoms.

10. The process of claim 3 wherein the thermoplastic resin is a polyolefin.

11. The process of claim 10 wherein the polyolefin is polyethylene.

12. The process of claim 3 wherein the normally gaseous inert compound is a halogenated hydrocarbon containing from 1 to 4 carbon atoms.

13. The process of claim 12 wherein the halogenated hydrocarbon is dichlorotetrafluoroethane.

14. The process of claim 3 wherein the thermoplastic resin is a fluorocarbon resin.

15. The process of claim 13 wherein the fluorocarbon polymer is a copolymer of tetrafluoroethylene and hexafluoropropylene.

16. The process of claim 3 wherein the thermoplastic resin is a polyoxymethylene.

17. The process of claim 3 wherein the thermoplastic resin is a polyamide.

18. The process of claim 17 wherein the thermoplastic resin is polycaprolactam.

References Cited

UNITED STATES PATENTS

| | | | |
|---|---|---|---|
| 2,835,927 | 5/1958 | Henning | 264—47 |
| 2,991,508 | 7/1961 | Fields et al. | 264—176 |
| 3,072,584 | 1/1963 | Karpovich | 264—53 XR |

ALEXANDER H. BRODMERKEL, *Primary Examiner.*

P. E. ANDERSON, *Assistant Examiner.*